June 24, 1958 R. E. SANDIFORD 2,840,708

VARIABLE RING COUNTER

Filed Jan. 13, 1956

INVENTOR.
ROBERT E. SANDIFORD

BY

Christie, Parker & Hale
ATTORNEYS

United States Patent Office 2,840,708

Patented June 24, 1958

2,840,708

VARIABLE RING COUNTER

Robert E. Sandiford, Temple City, Calif., assignor to Consolidated Electrodynamics Corporation, Pasadena, Calif., a corporation of California Application January 13, 1956, Serial No. 558,951

4 Claims. (Cl. 250—27)

Figures 1, 2:
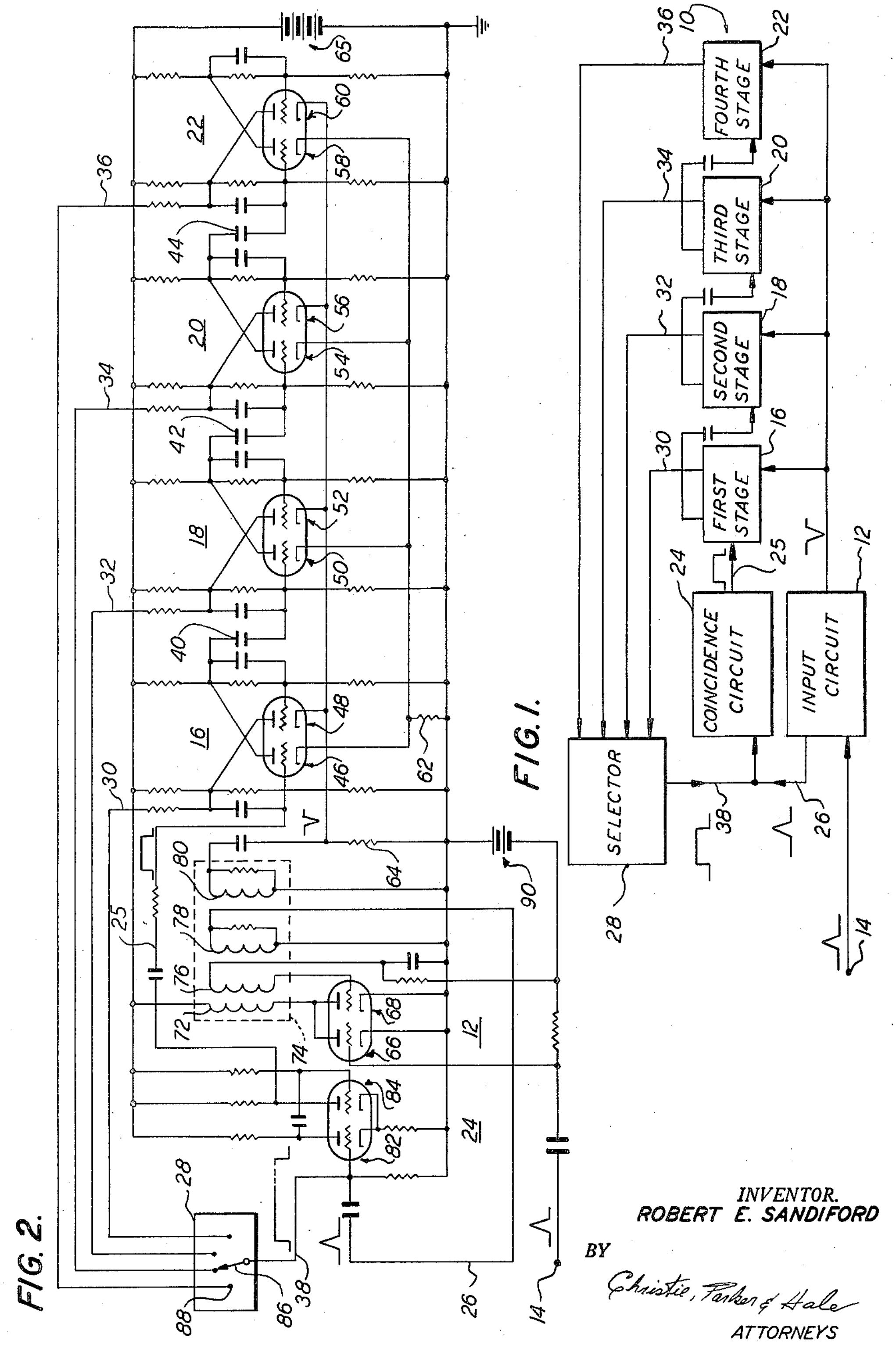

This invention relates to the field of electronic ring counters and it has particular reference to means for changing the number of active stages in an electronic ring counter.

In recent years electronic ring counters have come to serve a variety of purposes. Illustrative of these is where the ring counter is employed to control the actuation of switches in a switching network. For example, in a data processing system an extensive switching network may be employed to commutate between a plurality of input terminals and a common output terminal. The input terminals may each receive the output of different transducers or other devices, and the switching network thus enables scanning and sequential high speed recording of the output values.

Commensurate with the expanding uses of ring counter circuits in modern scanning and logging systems, situations are encountered where it is desirable to have a ring counter provided with a variable number of stages so as to have some control over the number of input terminals scanned without resorting to re-wiring the ring counter or counters. For example, with a variable ring counter, the counter may be set to actuate switches which scan through input terminals desired to be read out at more frequent intervals without scanning through the entire plurality of input terminals. Where large amounts of data are being processed, this results in a substantial saving in data-processing time.

The conventional electronic ring counter circuit is provided with a plurality of stages and an input circuit for providing actuating pulses to successively actuate the counter stages. The present invention provides means for selecting the number of active stages included in the actuation cycle in a ring counter. In accordance with the present invention, the counting operation is effected by a series of bi-stable flip-flop stages arranged so that the condition of only one of the stages is different from the condition of the other stages at any time. The stage which is in a different condition of actuation progresses along the stages in accordance with the count. A coincidence circuit arrangement is coupled to the first stage of the counter, the input circuit of the counter is coupled to the coincidence circuit for supplying actuating pulses to the coincidence circuit, and means is coupled between the outputs of the several stages of the counter and the coincidence circuit for selectively coupling the output of any last desired stage of the counter to the coincidence circuit. The output of the selected stage furnishes a gating signal when the stage is actuated to a condition which differs from that of the other stages, which gating signal causes the coincidence circuit to re-actuate the first stage of the counter on receipt of the next actuating pulse from the input circuit of the counter. The particular stage selected thereby determines the number of stages included in the actuation cycle. Effectively then, the invention provides means for varying the number of active stages in the ring counter.

The invention is explained in greater detail with reference to the drawings, in which:

Fig. 1 is a schematic representation of a preferred embodiment of the invention; and Fig. 2 is a circuit diagram showing the circuit of Fig. 1 in greater detail.

With reference to Fig. 1, the ring counter circuit includes a plurality of interconnected counter stages 10 coupled to an input circuit 12. The input circuit may receive pulses from any suitable source at the terminal 14 and it in turn applies actuating pulses to the several stages of the counter. The stages of the counter are shown respectively as a first stage 16, a second stage 18, a third stage 20 and a fourth stage 22. Of course, any desired number of stages may be provided, but four stages are sufficient to illustrate the invention. It is to be understood that the wave forms shown at various positions on the circuitry of Fig. 1 are not drawn to scale and merely represent one way in which the circuit may operate.

A coincidence circuit 24 is coupled to the first stage of the counter by a circuit 25, and the input circuit 12 is coupled to the coincidence circuit by a circuit 26 so that actuating pulses which correspond to the pulses which are applied to the input terminal 14 are supplied to the coincidence circuit as well as to the stages of the counter. A selector means 28 is coupled to the outputs of the several stages of the counter by the respective circuits 30, 32, 34, 36 and the selector means is coupled to the coincidence circuit by a circuit 38. The selector means may be set to couple the output of any last desired stage of the counter to the coincidence circuit, with the output of the selected stage furnishing a gating signal when the stage is actuated which signal causes the coincidence circuit to re-actuate the first stage of the counter on receipt of the next actuating pulse from the input circuit. The stages of the counter are arranged so that the condition of only one of the stages may be different from the condition of the other stages at any time. Thus, the stage which is actuated to a condition which is different from the other stages may be employed to provide the gating signal, and re-setting of only the first stage serves to re-set the entire counter. The particular stage selected by the selector means 28 determines the number of stages included in the actuation cycle of the counter.

With the overall understanding gained from Fig. 1, reference may be had to Fig. 2 wherein a preferred embodiment of the invention is displayed in much greater detail. The reference numbers used for Fig. 1 are also used for the analogous structure of Fig. 2.

As shown in Fig. 2, the respective counter stages 16, 18, 20, 22 each constitute a bi-stable multivibrator circuit with successive stages being coupled together in a conventional manner through the respective capacitors 40, 42, 44. The first stage 16 employs a double electron tube having a first section 46 and a second section 48, which sections are coupled together so that only one of them can conduct at any time. Similarly, the second stage has a first section 50 and a second section 52; the third stage has a first section 54 and a second section 56; and the fourth stage has a first section 58 and a second section 60. The cathodes of all of the first sections are coupled to ground through a common resistor 62, and the cathodes of all the second sections are coupled to ground through a common resistor 64. The resistor 62 should be about three times as large as the resistor 64 for a four stage counter, typical values being 10,000 ohms and 3,300 ohms respectively. All of the tubes receive plate voltage from a battery 65, a typical value for which is 250 volts.

The input circuit 12 may be a blocking oscillator circuit which includes a double electron tube having a first section 66 and a second section 68. The blocking oscillator receives input pulses from the terminal 14 and provides uniform actuating pulses across a primary winding 72 of a transformer 74. The transformer has three secondary windings 76, 78, 80 with the first secondary winding 76 assisting in the operation of the blocking oscillator 12 in a conventional manner, and with the third secondary winding 80 supplying negative pulses to the cathodes of the second sections of the respective counter stages in accordance with the actuating pulses produced by the blocking oscillator in the primary winding 72.

The second secondary winding 78 forms part of the circuit 26 which couples the input circuit 12 to the coincidence circuit 24, the coincidence circuit being a mono-stable multivibrator circuit having a first tube section 82 and a second tube section 84. The output of the mono-stable multivibrator circuit 24 is coupled by the circuit 25 to the grid of the first tube section of the first counter stage 16.

The circuits 30, 32, 34, 36 severally couple the plates of the second tube sections of the respective counter stages back to the selector means 28. The selector means is a simple switch having a selector arm 86 and a plurality of contacts 88. The circuits 30, 32, 34, 36 are severally connected to the respective contacts of the switch, with the selector arm being coupled by the circuit 38 to the grid of the first tube section of the mono-stable multivibrator or coincidence circuit 24.

With the circuit set up as shown in Fig. 2, only one of the first tube sections of the four counter stages can conduct at any one time because of the common cathode resistor 62, and because of the bi-stable action of each stage. It follows that only one of the second tube sections of the four stages can be in a non-conducting stage at any one time.

At the start, assume that the first tube section 46 of the first stage is the one that is conducting and the second tube section 48 of the first stage is the one that is not conducting. In all of the other stages, the first tube section will be non-conducting and the second tube section will be conducting. Then, the operation of the circuit of Fig. 2 may be explained as follows.

In its quiescent condition, the grids of both tube sections of the blocking oscillator circuit 12 are biased below cut-off by a battery 90. When a positive input pulse is applied to the terminal 14, it drives the grid of the first tube section 66 of the blocking oscillator above cut-off causing the first tube section of the blocking oscillator to conduct through the primary winding 72 of the transformer. The signal produced in the first secondary winding 76 is applied between the cathode and grid of the second tube section 68 of the blocking oscillator causing the second tube section to become conductive and thereby to increase the current through the primary winding 72 which further increases the signal produced in the first seconary winding 76. When the second tube section 68 of the blocking oscillator approaches current saturation, the current flow through the primary winding 72 will begin to decrease which together with the negative bias provided by the battery 90 causes the blocking oscillator to shut off. Therefore, by tripping the blocking oscillator with a series of positive input pulses applied at the terminal 14, a series of uniform pulses will be generated in the secondary windings 76, 78, 80 of the transfomer, the second secondary winding 78 supplying positive pulses to the grid of the first tube section 82 of the coincidence circuit 24 and the third secondary winding 80 supplying negative pulses to the cathodes of all second tube sections of the counter stages.

Since we have assumed that the first tube section 46 of the first stage is conducting and the second tube section 48 is non-conducting, the first negative pulse from the third secondary winding 80 will increase the potential between the grid and cathode of the second tube section 48 of the first stage substantially, but will not have any substantial effect on the second tube sections 52, 56, 60 of the other stages because these are already in the conducting state. The increase in potential between the grid and cathode of the second tube section 48 of the first stage causes the second tube section of the first stage to conduct, which in turn drives the grid of the first tube section 46 below cut-off and thereby shuts off the first tube section of the first stage. Shutting off the first tube section 46 of the first stage produces a positive pulse through the coupling capacitor 40 which causes the grid of the first tube section 50 of the second stage to rise in potential. This causes the first tube section 50 of the second stage to conduct, which in turn drives the grid of the second tube section 52 of the second stage below cut-off, shutting off the second tube section 52 of the second stage.

When the first tube section 50 of the second stage conducts, a negative going pulse is transmitted through the coupling condenser 42. However, this pulse has no significant effect on the first tube section 54 of the third stage because this section is already in its non-conducting state. Therefore, the first negative pulse received from the secondary winding 80 causes the second counter stage to obtain the state originally assumed for the first counter stage but has no effect on the third and fourth stages.

The successive negative pulses received from the third secondary winding 80 will then cause the originally assumed state for the first stage to travel along the counter stages.

If the selector switch is set on the circuit 34 as shown, then when the third stage 20 is actuated through the coupling condenser 42, its second tube section 56 will become non-conductive causing the potential in the plate circuit of the second tube section 56 to rise, which raised potential is transmitted by the circuit 34 and by the circuit 38 to the grid of the first tube section 82 of the mono-stable multivibrator circuit 24.

Upon receiving the next positive going actuation pulse from the secondary winding 78, the grid of the first tube section 82 of the mono-stable multivibrator 24 will be driven above its cut-off value causing this first tube section to conduct, which in turn shuts off the second tube section 84 momentarily, and thereby causes a positive going pulse to be transmitted through the circuit 25 to the grid of the first tube section 46 of the first stage 16. This turns the first tube section 46 of the first stage on and the second tube section 48 off, thereby putting the first stage 16 back into its actuated condition. The positive going pulse transmitted by the circuit 25 is of relatively long duration compared to the actuating pulses from the input circuit. It ceases when the mono-stable multivibrator circuit swings back to its stable state which is with its second tube section 84 conducting.

The actuating pulse derived from the secondary winding 78 which fired the mono-stable multivibrator is coincident with a negative actuating pulse derived from the secondary winding 80 and applied to the cathode of the second tube section 56 of the third stage. The negative pulse from the secondary winding 80 turns on the second tube section 56 of the third stage which in turn shuts off the first tube section 54 of the third stage, thereby reverting the third stage to its unactuated condition. When the first tube section 54 of the third stage is so cut off, a positively going pulse is transmitted through the coupling condenser 44 to the grid of the first tube section 58 of the fourth stage, thereby attempting to actuate the fourth stage. This attempt at actuating the fourth stage is subsantially concurrent with the attempt to re-actuate the first stage through the circuit 25. However, as previously stated, only one first tube section of the counter stages can be conductive at a time because of the common cathode resistor 62. If more than one first tube section were conducting, this would raise the cathode potential of the conducting first tube section to the point that conduction would cease. Since the positively going pulse in the circuit 25 is of longer duration than the positive going pulse through the coupling condenser 44, the first stage assumes the actuated condition and wins out over the fourth stage which remains in its unactuated condition. Thus, the number of stages in the actuation cycle has been effectively foreshortened by use of the selector switch 28.

Normally, the last stage would be coupled to the first stage by a coupling capacitor similar to any one of those shown at 40, 42, 44 so that negative actuating pulses would successively actuate the stages one at a time and in a cycle. It should be noted that such a coupling capacitor could be employed between the last and first stages in lieu of the circuit 36, thereby eliminating one of the contacts on the switch 28.

I claim:

1. An electronic ring counter circuit comprising a plurality of bi-stable counter stages, means interconnecting the stages to cause the conductive condition of only one of the stages to be different from the conductive condition of the other stages at any time, an input circuit coupled to the counter stages for providing periodic actuating pulses simultaneously to each of these stages, a coincidence circuit coupled to the first stage of the counter, means coupling the input circuit to the coincidence circuit for supplying actuating pulses to the coincidence circuit simultaneously with the pulses applied to the counter stages, and means coupled between the outputs of the several stages and the coincidence circuit for selectively coupling the output of any last desired stage of the counter to the coincidence circuit, the output of the selected stage furnishing a gating signal when the stage is actuated which causes the coincidence circuit to re-actuate the first stage of the counter on receipt of the next actuating pulse, with the particular stage selected thereby determining the number of active stages included in the actuation cycle of the ring counter.

2. In an electronic ring counter circuit having a plurality of stages and an input circuit for providing actuating pulses to successively actuate the counter stages, the improvement which comprises a coincidence circuit coupled to the first stage of the counter, means coupling the input circuit to the coincidence circuit for supplying actuating pulses to the coincidence circuit, and a selector switch coupled between the outputs of the several stages and the coincidence circuit for selectively coupling the output of any last desired stage of the counter to the coincidence circuit, the output of the selected stage furnishing a gating signal when the stage is actuated which causes the coincidence circuit to re-actuate the first stage of the counter on receipt of the next actuating pulse, with the particular stage selected thereby determining the number of active stages included in the actuation cycle of the ring counter.

3. In an electronic ring counter circuit having a plurality of bi-stable multivibrator stages and an input circuit including a blocking oscillator for providing actuating pulses to successively actuate the counter stages, the improvement which comprises a mono-stable multivibrator circuit coupled to the first stage of the counter, transformer means coupling the blocking oscillator to the mono-stable multivibrator circuit for supplying actuating pulses to the mono-stable multivibrator circuit, and a selector switch coupled between the outputs of the several stages and the mono-stable multivibrator circuit for selectively coupling the output of any last desired stage of the counter to the mono-stable multivibrator circuit, the output of the selected stage furnishing a gating signal when the stage is actuated which causes the monostable multivibrator circuit to re-actuate the first stage of the counter on receipt of the next actuating pulse, with the particular stage selected thereby determining the number of active stages included in the actuation cycle of the ring counter.

4. In an electronic ring counter circuit, the combination which comprises a plurality of counter stages, each stage having a first electron tube and a second electron tube coupled together for bi-stable action so that only one electron tube of the stage can conduct at a time, means coupling the cathodes of the first electron tubes of all the stages through a common resistor so that only one of said first electron tubes can conduct at a time, an input circuit for supplying negative going pulses to said commonly coupled cathodes of all the first electron tubes, means coupling successive stages together so that the negative pulses from the input circuit successively travels the actuated first electron tube down the series of stages, a coincidence circuit having its output coupled to the grid of the first electron tube of the first stage, means coupling the input circuit to the coincidence circuit for supplying actuating pulses to the coincidence circuit, and means coupled between the several plate circuits of the second electron tubes of all the stages and the coincidence circuit for selectively coupling the output of the second electron tube of any last desired stage of the counter to the coincidence circuit, the plate voltage on the second electron tube of the selected stage furnishing a gating signal to the coincidence circuit when said second electron tube goes non-conductive, the gating signal causing the coincidence circuit to re-actuate the first electron tube of the first stage of the counter on receipt of the next actuating pulse, with the particular stage selected thereby determining the number of active stages included in the actuation cycle of the ring counter.

References Cited in the file of this patent

UNITED STATES PATENTS

| | | |
|---|---|---|
| 2,402,916 | Schroeder | June 25, 1946 |
| 2,521,789 | Grosdoff | Sept. 12, 1950 |

FOREIGN PATENTS

| | | |
|---|---|---|
| 704,816 | Great Britain | Mar. 3, 1954 |